United States Patent Office
3,634,530
Patented Jan. 11, 1972

3,634,530
SEPARATION OF $C_8$ AROMATIC HYDROCARBONS WITH CUPROUS SULFONATE SALT COMPLEXES
James L. Bills, Provo, Utah, assignor to Monsanto Company, St. Louis, Mo.
No Drawing. Filed Feb. 10, 1970, Ser. No. 10,312
Int. Cl. C07c 15/10, 7/16
U.S. Cl. 260—669 A
10 Claims

ABSTRACT OF THE DISCLOSURE

Mixtures of $C_8$ aromatic hydrocarbons are separated according to structure and type by contacting a mixture of at least two $C_8$ aromatic hydrocarbons having different structures and types with a liquid cuprous sulfonate salt complex. The combination of $C_8$ aromatic hydrocarbons and cuprous sulfonate salt complex is then cooled until a solid phase is formed. A hydrocarbon fraction recovered from the solid phase will be substantially richer in one of the $C_8$ aromatic hydrocarbons than in the original mixture.

BACKGROUND OF THE INVENTION

This invention relates to a process for separating organic compounds. In one aspect, this invention relates to the separation of $C_8$ aromatic hydrocarbon compounds according to structure and type. In another aspect, this invention relates to the separation of $C_8$ aromatic hydrocarbons by the formation of a solid phase in a liquid medium. In still another aspect, this invention relates to the separation of mixtures of $C_8$ aromatic hydrocarbons by the formation of a solid phase in a liquid medium utilizing cuprous sulfonate salt complexes.

The separation of hydrocarbon compounds in such industries as the petrochemical industry has long been a problem. Various methods have been used for separating and purifying hydrocarbon compounds. Probably the most widely used method for separating and purifying hydrocarbons is fractional distillation. However, fractional distillation depends on a difference in boiling points of the materials to be separated and purified. Thus, fractional distillation techniques are undesirable for separating and purifying hydrocarbon compounds having relatively close boiling points. Since $C_8$ aromatic hydrocarbons have very close boiling points, it is difficult, if not impossible, to separate such compounds using fractional distillation techniques. For example, styrene and ortho-xylene have boiling points within 1° C. of each other. Likewise, para-xylene and meta-xylene have boiling points within 1° C. of each other. Ethylbenzene and para-xylene have only 2° C. difference in boiling points.

Since it is vitally important to produce pure $C_8$ aromatic hydrocarbon compounds for subsequent use in the petrochemical industry, other methods have been resorted to in order to purify such materials. Among these other methods are fractional crystallization techniques. While some of the $C_8$ aromatic hydrocarbons can be separated by fractional crystallization techniques, extremely low temperatures are necessary for such separations.

I have discovered a method whereby $C_8$ aromatic hydrocarbon compounds can be readily separated and purified without resorting to the use of extremely low temperatures. My invention for separating $C_8$ aromatic hydrocarbons provides a method of more efficiently separating $C_8$ aromatic hydrocarbons without the restrictions of eutectic mixtures associated with conventional crystallization methods. Thus my invention provides for separation of $C_8$ aromatic hydrocarbons in purer form using fewer separation stages than normally found in conventional crystallization methods. It is an object of my invention to provide a new method for separating and purifying $C_8$ aromatic hydrocarbons.

Another object of my invention is to provide a novel process whereby $C_8$ aromatic hydrocarbons are separated and purified according to their structure and type.

Still another object of my invention is to provide a method for separating and purifying $C_8$ aromatic hydrocarbons by the formation of a solid phase in a liquid medium utilizing cuprous sulfonate salt complexes.

Other aspects, advantages and objects of my invention will be apparent to those skilled in the art upon consideration of the accompanying disclosure and claims.

SUMMARY OF THE INVENTION

The present invention is a method for separating $C_8$ aromatic hydrocarbons. According to my invention, $C_8$ aromatic hydrocarbons are separated according to structural types. My invention provides for the formation of a solid phase in a liquid medium. This solid phase is formed by combining a mixture of $C_8$ aromatic hydrocarbon with a liquid cuprous sulfonate salt complex and cooling the resulting mixture until the solid phase forms. The cuprous sulfonate salt complexes used in my invention are complexes consisting essentially of:

(a) a cuprous sulfonate salt having the formula $RSO_3Cu$ wherein R is a radical containing from 1 to 20 carbon atoms and having substituents selected from the group consisting of hydrogen, chlorine, fluorine and combinations thereof; and (b) an organic complexing agent selected from the group consisting of aromatic hydrocarbons, olefin hydrocarbons, nitriles, nitro-alkyls, nitro-aryls, sulfones and combinations thereof.

Mixtures of hydrocarbons containing at least two of the following types of $C_8$ aromatic compounds can be separated by the process of my invention by contacting said mixtures with the cuprous sulfonate salt complexes which act as preferential solvents.

Since my invention involves the separation of mixtures of hydrocarbons according to the structural types of the hydrocarbons present in the mixtures, I shall refer to the various types of structures by a numerical designation throughout this description of the invention. The types of hydrocarbons that are separated by my invention are represented by the following numerical designations:

Type I—Styrene
Type II—Para-xylene
Type III—Meta-xylene, ortho-xylene and ethylbenzene The solid phase formed by combining the mixture of $C_8$ aromatic hydrocarbons and the liquid cuprous sulfonate salt complex and thereafter chilling the resulting combination, can be readily separated from the liquid medium by conventional techniques such as filtration, centrifugation and the like. A hydrocarbon fraction can then be recovered from the resulting solid phase which will be substantially richer in the $C_8$ aromatic hydrocarbon having the lowest type number that was present in the original mixture of hydrocarbons. The liquid medium will be substantially richer in the $C_8$ aromatic hydrocarbons having the highest numerical type number than the original mixture of $C_8$ aromatic hydrocarbons.

Thus, for example, a mixture of hydrocarbons containing styrene, which is Type I, and ortho-xylene, which is Type III can be separated according to the process of my invention and the hydrocarbon fraction that is recovered from the solid phase will be substantially richer in the styrene (Type I) than the original mixture. Likewise, the ortho-xylene (Type III) in the remaining liquid mixture of hydrocarbons will be present in a substantially greater concentration than the concentration of the ortho-xylene (Type III) in the original mixture. Similar separations may be made with the other types of hydrocarbons listed above. Thus, my invention provides a method for recovering the $C_8$ aromatic hydrocarbons having the lowest type number from the solid phase while the $C_8$ aromatic hydrocarbons having the highest type number can be recovered in increased concentration from the liquid phase when the above-mentioned cuprous sulfonate salt complexes are combined with mixtures of $C_8$ aromatic hydrocarbons and the resulting combination cooled until a solid forms.

PREFERRED EMBODIMENTS

The cuprous sulfonate salt complexes that are utilized as solvents in my extraction processes consist essentially of:

(a) a cuprous sulfonate salt having the formula $RSO_3Cu$ wherein R is a radical containing from 1 to 20 carbon atoms having substituents selected from the group consisting of hydrogen, chlorine, fluorine and combinations thereof; and (b) an organic complexing agent selected from the group consisting of aromatic hydrocarbons, olefin hydrocarbons, nitriles, nitro-alkyls, nitro-aryls, sulfones and combinations thereof.

Preferably, the R group in the cuprous sulfonate salt portion of the complex will contain from 1 to 10 carbon atoms.

The cuprous sulfonate salt complexes that are used in my invention exist as complexes of the specific cuprous sulfonate salt and an organic complexing agent that is either an aromatic hydrocarbon, an olefin hydrocarbon, a nitrile, a nitro-alkyl, a nitro-aryl, a sulfone or a combination thereof. Attempts to remove the organic complexing agent from the complex result in a decomposition of the complex to give metallic copper and various residual products. Usually, the organic complexing agent that is present in the cuprous sulfonate salt complexes used in my invention is part of the reaction medium wherein the cuprous sulfonate salt is formed. Thus, if it is desired to form a cuprous sulfonate salt complex containing a specific cuprous sulfonate salt and toluene, the cuprous sulfonate salt can be formed in the presence of toluene, which would serve as the complexing agent.

The cuprous sulfonate salt component of the complexes used in my invention can be produced by reacting a sulfonic acid with cuprous oxide in the presence of the desired complexing agent. This reaction can be represented by the following equation:

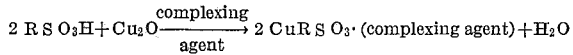

$$2\ RSO_3H + Cu_2O \xrightarrow{\text{complexing agent}} 2\ CuRSO_3 \cdot (\text{complexing agent}) + H_2O$$

As used in the above equation "complexing agent" will be either an aromatic hydrocarbon, an olefin hydrocarbon, a nitrile, a nitro-alkyl, a nitro-aryl, a sulfone or a combination thereof. The reaction can be conveniently carried out by combining the reactants and heating them to a reflux temperature. Inert diluents such as liquid paraffins and the like may also be present in the reaction medium. The reaction medium is refluxed and the water reaction product can be condensed overhead. In some instances, the water product is conveniently recovered as an azeotrope of the water and the reaction medium. The water reaction product can also be removed by other methods such as by use of a dessicant. It of course understood that when the reactants or the reaction medium are quite volatile, the reaction should be carried out in a closed reaction zone under a positive pressure. The reaction represented by the equation above, is usually carried out at a temperature in excess of 75° C. It is usually desirable to carry out the reaction at atmospheric pressure or above.

It is desirable to have at least a 1:1 mol ratio of the complexing agent to sulfonic acid present in the reaction medium for carrying out the above reaction. Larger mol ratios of complexing agent to sulfonic acid are desired for carrying out the reaction.

In some instances it may be desirable to carry out the above-mentioned reaction in the presence of a small amount of metallic copper. The presence of a small amount of copper in the above-mentioned reaction tends to increase the yield of the cuprous sulfonate salt complex. When copper is present during the reaction it may be first washed with HCl and/or amalgamated.

The cuprous sulfonate salt complexes used in my invention can also be prepared by reacting a sulfonic acid with basic cupric carbonate in an aqueous solution. This reaction is represented by the following equation:

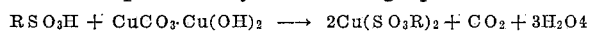

$$RSO_3H + CuCO_3 \cdot Cu(OH)_2 \longrightarrow 2Cu(SO_3R)_2 + CO_2 + 3H_2O4$$

The cupric sulfonate salt is carefully dried and then reduced by reacting with metallic copper in the presence of the appropriate complexing agent to produce the desired cuprous sulfonate salt complex. This reaction is represented by the following equation:

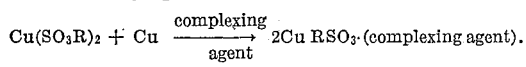

$$Cu(SO_3R)_2 + Cu \xrightarrow{\text{complexing agent}} 2Cu\ RSO_3 \cdot (\text{complexing agent}).$$

In carrying out the above reaction, the reactivity of the copper may be increased if the metallic copper is first washed with hydrochloric acid and/or amalgamated. In some instances the above reaction, wherein the cupric sulfonate salt is reduced with metallic copper, is carried out in the presence of an additional polar solvent such as sulfolane or nitrobenzene. These polar solvents aid in dissolving the cupric salt, thus increasing the reaction rates. Inert diluents such as liquid paraffins may also be present in the reaction medium. The above reactions for producing the cupric sulfonate salts and the cuprous salt complexes therefrom can be carried out at atmospheric pressures and at reflux temperatures. Temperatures of 20° C. and above and pressures of at least 1 atmosphere will be utilized in carrying out the reaction. The mol ratio of complexing agent to cupric sulfonic acid salt should be at least 1:1 in the above reaction, with larger ratios being preferred.

The sulfonic acids used in the foregoing reactions can be represented by the structural formula $RSO_3H$, wherein R contains from 1 to 20 carbon atoms and contains substituents selected from the group consisting of hydrogen, chlorine, fluorine and combinations thereof. Preferably, the R group will contain from 1 to 10 carbon atoms. Thus, the R group on the sulfonic acid starting material and the R group in the cuprous sulfonate salt product can be hydrocarbon, flurocarbon, chlorocarbon, flurohydrocarbon, chlorohydrocarbon and flurochlorohydrocarbon. Non-limiting examples of the sulfonic acid starting materials include methane sulfonic acid, chloromethane sulfonic acid, chlorofluromethane sulfonic acid, difluromethane sulfonic acid, trifluromethane sulfonic acid, ethane sulfonic acid, 2-chloroethane sulfonic acid, pentachloroethane sulfonic acid, isobutane sulfonic acid, propane sulfonic acid, heptachloropropane sulfonic acid, n-heptane sulfonic acid, decane sulfonic acid, n-eicosane sulfonic acid, benzene sulfonic acid, para-toluene sulfonic acid, para-chlorobenzene sulfonic acid, 2,4,6-triflurobenzene sulfonic acid, β-naphthalene sulfonic acid, cyclohexane sulfonic acid, para-butylbenzene sulfonic acid, 2-chloro-4-fluro-6-ethylbenzene sulfonic acid, and the like.

As shown by the above formulae, the sulfonic acid starting material determines the cuprous sulfonic acid salt portion of the complexes that are used in my invention. In other words, the R group on the sulfonic acid starting material is unchanged in the above-mentioned reactions.

The organic complexing agents referred to in the above-mentioned formulae are selected from the group consisting of aromatic hydrocarbons, olefin hydrocarbons, nitriles, nitro-alkyls, nitro-aryls, sulfones and combinations thereof. When mixtures of the complexing agents are present during the preparation of the cuprous sulfonate salt complexes used in my invention, the final cuprous sulfonate salt complex will comprise mixed complexes of the various complexing agents and the cuprous sulfonate salt. Mixed complexes can also be prepared by contacting the cuprous sulfonate salt complexes with a different complexing agent. For example, a cuprous sulfonate salt complex can be prepared in toluene and the resulting cuprous sulfonate salt · (toluene) complex can be combined with an olefin such as ethylene to produce a cuprous sulfonate salt · (toluene+ethylene) complex. This procedure is also useful for making complexes wherein unsaturated nitriles serves as the complexing agents. In some instances the unsaturated nitrile compounds may tend to polymerize under the reaction conditions wherein the cuprous sulfonate salt complex is formed. Therefore, to prevent this undesired polymerization, an initial complex can be formed comprising the cuprous sulfonate salt complexed with a complexing agent such as an aromatic compound, an olefin, one of the nitro compounds or one of the sulfones and this first complex can be thereafter treated with the unsaturated nitrile to produce the desired cuprous sulfonate salt complexed with the unsaturated nitrile.

The complexing agent that is a portion of the cuprous sulfonate salt complexes used in my invention can be a hydrocarbon aromatic compound, an olefin hydrocarbon compound, a nitro-alkyl compound, a nitro-aryl compound, a sulfone compound or a nitrile. Preferably, such complexing agents contain up to 10 carbon atoms per molecule. Suitable aromatic compounds are benzene, toluene, o-xylene, m-xylene, p-xylene, ethylbenzene, styrene, 1,3,5-trimethylbenzene, naphthalene, β-ethylnaphthalene, and the like.

Non-limiting examples of olefin hydrocarbons that can be used as the complexing agent in the cuprous sulfonate salt complexes used in my invention include ethylene, propylene, isobutylene, hexene-1, hexene-2, cyclohexene, decene-1, 1,3-butadiene, isoprene, and the like.

The nitriles that can be utilized as the complexing agent in the cuprous sulfonate salt complexes used in my invention include acetonitrile, acrylonitrile and methacrylonitrile, and the like. The nitrile complexing agents can also be nitrile ethers and nitrile esters such as 3-methoxyacetonitrile, 3-ethoxyacetonitrile, 3-methoxypropionitrile, 3-ethoxypropionitrile, 3-propoxypropionitrile, 4-methoxybutyronitrile, methoxyethoxy propionitrile, dicyanoethylated propylene glycol, and the like.

The nitro-alkyls and nitro-aryls that can be utilized as the complexing agent in the cuprous sulfonate salt complexes used in my invention include nitromethane, nitroethane, nitropropane, nitrobutane, nitrobenzene, dinitrobenzenes, nitrotoluenes, and the like. Usually the nitroakyl employed contain no greater than 12 carbon atoms in the alkyl group and the nitro-aromatics contain no greater than 12 carbon atoms.

The sulfones that are useful as complexing agents in the cuprous sulfonate salt complexes used in my invention include ethyl sulfone, propyl sulfone, methylethyl sulfone, methylbutyl sulfone, and other alkyl sulfones containing up to 6 carbon atoms in the alkyl radicals, the alkyl radicals being the same or different and being either straight chain or branched chain. The aryl sulfones include sulfolane and the alkyl sulfolanes, particularly the alkyl sulfolanes in which the alkyl radicals have 1 to 6 carbon atoms. The most useful of the sulfones are sulfolane and the methyl sulfolanes.

Mixtures of the above complexing agents can be present in the complexes used in my invention.

According to my invention, styrene, which is a Type I aromatic hydrocarbon, can be separated from a fraction that contains styrene in admixture with para-xylene or any of the other $C_8$ aromatic hydrocarbons such as orthoxylene, meta-xylene and ethylbenzene. Likewise, para-xylene, which is a Type II aromatic hydrocarbon, can be separated from a fraction containing para-xylene and the Type III aromatic hydrocarbons which are ortho-xylene, meta-xylene and ethylbenzene.

My invention comprises contacting a mixture of hydrocarbons containing at least two of the above-mentioned types of $C_8$ aromatic hydrocarbons with the cuprous sulfonate salt complex in a suitable contacting zone. The cuprous sulfonate salt complex should be in liquid form in the contacting zone. The cuprous sulfonate salt complex that is contacted with the mixture of hydrocarbons undergoes a type of exchange reaction wherein the first added complex actually forms a second complex. This second complex will be a cuprous sulfonate salt complex comprising the cuprous sulfonate salt complexed with the $C_8$ aromatic hydrocarbon compound having the lowest type number that is present in the initial mixture of hydrocarbons in the contacting zone. At least a portion of the original complexing agent is released from the first cuprous sulfonate salt complex and can be removed from the contacting zone along with the remaining uncomplexed hydrocarbons.

Since there is an exchange of complexing agents involved in separations carried out using my invention, it is necessary to utilize a first complex wherein at least a portion of the complexing agent is different from the hydrocarbon or hydrocarbons to be removed from the initial mixture as a part of the second formed complex phase.

The solid phase, which is the second formed complex, can be withdrawn from the contacting zone and the hydrocarbon compound that is present as the second complexing agent can be recovered therefrom. This recovery process can be carried out by decomposing the second formed complex by heating it. However, it is most desirable to recover the hydrocarbon complexing agent from this second complex by an additional exchange of complexing agents. This additional exchange of complexing agents can be brought about by merely contacting the second complex with a molar excess of at least one of the above-mentioned complexing agents which are olefin hydrocarbons, aromatic hydrocarbons, nitriles, nitro-aryls or sulfones. It is desirable to heat the solid phase during this additional exchange to melt the solid. The complexing agent added to the second complex to release the hydrocarbon therefrom, must be different from the hydrocarbon to be released. This exchange of complexing agents will release the hydrocarbons having the lowest type numbers that were removed from the original mixture of hydrocarbons in the original contacting zone and thus form a third cuprous sulfonate salt complex. This third formed cuprous sulfonate salt complex can then be returned to the original contacting zone and the process can be repeated. Thus, my invention provides a convenient continuous separation process that can be carried out in conventional equipment.

Some of the cuprous sulfonate salt complexes utilized to carry out the separations of my invention contain complexing agents that are very strongly complexed with the cuprous sulfonate salt portion of the complex. In these situations, it is often difficult to effect an exchange of such strong complexing agents by the $C_8$ aromatic hydrocarbons in the feed mixture to be separated, which form weaker complexes with the cuprous sulfonate salt. For example, if the cuprous sulfonate salt is complexed with a strong complexing agent such as a 1-olefin or an unsaturated nitrile, very large excesses of the $C_8$ aromatic hydrocarbons must be contacted with the complexes even to effect an exchange of a small portion of the strong complexing agent. In such instances, the temperature and pressure in the contacting zone can be adjusted so as to "drive off" the strong complexing agents and allow them to be replaced by the weaker $C_8$ aromatic components. This can be accomplished by raising the temperature in the contacting zone and/or reducing the pressure in the contacting zone.

To illustrate the above continuous separation process, a 50—50 mixture of Type I hydrocarbon, styrene, and a Type III aromatic compound such as ethylbenzene, can be contacted with a liquid first cuprous sulfonate salt complex such as cuprous trifluoromethane sulfonate complexed with hexene-1. The mixture of hydrocarbons and the liquid first cuprous sulfonate salt conplex can be mixed together, heated slightly to "drive off" the hexene-1 complexing agent and then cooled until a solid forms, which will be the second complex. This second complex is a complex of cuprous trifluromethane sulfonate complexed with styrene. The hexene-1 released in the exchange reaction will be mixed with the uncomplexed ethylbenzene rich liquid medium in the contacting zone. The solid second formed complex can be separated from the solid second formed complex by filtration and thereafter passed to a recovery zone. In the recovery zone, the second complex of cuprous trifluromethane sulfonated complexed with styrene can be contacted with a molar excess of hexene-1 to release the styrene therefrom. The temperature and pressure in the recovery zone should be sufficient to maintain the hexene-1 and the cuprous sulfonate salt complex in a liquid phase. Thus, styrene can be recovered from the recovery zone and the cuprous trifluromethane sulfonate complexed with hexene-1 can be removed from the recovery zone and the ethyl-benzene is recovered from the liquid medium of the contacting zone. The resulting cuprous trifluromethane sulfonate salt complexed with the hexene-1 can then be returned to the contacting zone and the process repeated.

It is within the scope of my invention to utilize a plurality of stages wherein the various streams recovered from the contacting and recovery zone can be further purified or enriched by simply repeating the above-mentioned steps on the effluent streams from the individual stages. The various contacting zones and the like used for carrying out my invention can be conventional contacting equipment.

The separations carried out using my invention very closely resemble known crystallization type of separation. The temperature and pressure conditions are maintained such that the hydrocarbon feed mixture added to the separation zone and the first cuprous sulfonate salt complex are in a liquid phase. After the feed mixture is thoroughly admixed with the first cuprous sulfonate salt complex the entire mixture is cooled until a solid phase forms in the contacting zone. This solid phase will be the second formed cuprous sulfonate salt complex which comprises the cuprous sulfonate salt complexed with the $C_8$ aromatic hydroacrbon having the lowest type number that was present in the hydrocarbon feed mixture.

The amount of first complex used in carrying out the separation process of my invention can vary considerably depending upon the types of $C_8$ aromatic hydrocarbon compounds to be separated as well as the physical conditions in the contacting zone. In general, as the mol ratio of the cuprous sulfonate salt complex to the total $C_8$ aromatic hydrocarbons in the feed mixture in the contacting zone decreases, the selectivity of the cuprous sulfonate salt complex for the $C_8$ aromatic hydrocarbons having the lowest type numbers in the mixture increases. Therefore, the optimum amount of first complex used will vary according to the amounts of the lowest type number $C_8$ aromatic hydrocarbons to be separated that are present in the hydrocarbon feed mixture to the contacting zone. In general, the amount of first complex employed in the contacting zone will be sufficient to provide a mol ratio of the cuprous sulfonate salt complex to the $C_8$ aromatic hydrocarbon components to be selectively complexed with the cuprous salt of 0.25:1 to 10:1. Preferably however, this mol ratio will be in the range of 0.33:1 to 4:1.

In some instances it may be desirable to carry out the contacting of the hydrocarbon feed mixture and the first complex in the presence of a non-complexible hydrocarbon diluent such as a paraffin or some other inert diluent. These inert diluents aid in maintaining a liquid medium in the contacting zone thus making it easier to handle and separate the solid phase that is formed as the reaction mixture is cooled. For convenience of handling, it is desirable to have a slurry of the solid phase and the liquid medium in the contacting zone after the reaction mixture has been cooled. In most instances, the non-complexible paraffins used to aid in maintaining the liquid medium in the contacting zone will be paraffins containing from 3 to 15 carbon atoms per molecule. Non-limiting examples of such paraffins are propane, n-butane, n-hexane, n-heptane, n-nonane, n-dodecane, n-pentadecane, isobutane, isopentane, and the like. Mixtures of these components can also be used. Petroleum ether is a very pratcical and useful diluent material that can be used in my invention. The amount of such materials used in the contacting zone may vary considerably. Of course, the amounts of such materials that are added to the contacting zone will depend to a large extent on the amount of such materials present in the original feed mixture. Usually, it is desirable to use about 0.25 to 5 volumes of non-complexible diluent material per volume of the complexible materials in the feed mixture which is to be separated.

Conditions of temperature and pressure for carrying out the separations of my invention may also vary widely. Most often, the initial contacting of the liquid cuprous sulfonate salt complexes with the $C_8$ aromatic hydrocarbon feed stream in my invention is carried out at a temperature in the range of about 0 to 200° C. The preferred temperature for carrying out my invention is from 25 to 150° C. The pressures that are maintained in the contacting zone, for carrying out my invention will be dependent upon the relative volatility of the various components in the feed stream as well as the complexing agents that are used. The pressure in the contacting zone must be high enough to maintain the component to be separated in a liquid phase.

As a practical matter, it is desirable to operate at or near atmospheric pressure, provided that the hydrocarbon components to be separated are maintained in a liquid state. Higher pressures of course can be utilized.

Care must be exercised in selecting temperatures and pressures to maintain the hydrocarbon feed mixture in the proper liquid.

It is necessary that the initial contacting of the liquid cuprous sulfonate salt complex with the $C_8$ aromatic hydrocarbon feed stream be carried out for a period of time sufficient to allow the formation of the second cuprous sulfonate salt complex which will be the cuprous sulfonate salt complexed with the $C_8$ aromatic hydrocarbon component having the lowest type number that is present in the initial feed mixture. Contact times of at least one minute are usually necessary. Preferably, the contact time will be from one minute to one hour while the $C_8$ aromatic hydrocarbon feed stream and the liquid cuprous sulfonate salt complex are maintained in a liquid phase. After this contact time, during which the second cuprous sulfonate salt complex is formed, the entire reaction mixture is cooled whereupon the second formed cuprous sulfonate salt complex solidifies. As mentioned above, the uncomplexed components in the reaction zone will be in a liquid phase upon this cooling.

The temperatures for cooling the reaction mixture can also vary over a wide range, depending upon the concentration of the cuprous sulfonate salt complex in the entire reaction mixture as well as the types of hydrocarbons and cuprous sulfonate salt complexes that are present. Generally, the entire reaction mixture will be cooled to a temperature of from −120° to +100° C. in order to form the solid cuprous sulfonate salt complex that is removed from the system. Preferably, the entire reaction mixture will be cooled to from 0° to 50° C. in order to form the solid cuprous sulfonate salt complex that is to be removed from the reaction mixture.

After the solid cuprous sulfonate salt complex has formed, it can be conveniently separated from the remaining liquid medium by any known process such as by decantation, filtration or centrifuging the reaction mixture.

The solids recovered from the above-mentioned separation steps can then be treated to release the complexed $C_8$ aromatic hydrocarbon having the lowest type number that was present in the feed mixture as discussed above. In some instances it may be desirable to subject this solid complex to a washing step prior to the actual recovery of the complexed $C_8$ aromatic hydrocarbon. This washing removes any of the uncomplexed $C_8$ aromatic hydrocarbon feed mixture that may be occluded by the solid complex. Benzene, toluene, and various liquid paraffins are suitable washing agents.

In some instances, the hydrocarbon compounds that are separated according to my invention may tend to polymerize when subjected to the conditions necessary to carry out the separation in the presence of the cuprous sulfonate salt complexes. This tendency to polymerize is especially noticeable with vinyl aromatic hydrocarbons. To avoid such polymerization, the cuprous sulfonate salt complexes may be stabilized by displacing a small portion of the complexing agent with certain oxygen or sulfur containing compounds. In order to so stabilize the polymerization activity of the complexes, the cuprous sulfonate salt complex can be brought into contact with such oxygen or sulfur containing compounds. For convenience, the oxygen or sulfur containing compounds can be dissolved in an aromatic hydrocarbon. A molar excess of the cuprous sulfonate salt complex to the oxygen or sulfur containing compound is used so as to not totally replace all of the complexing agent with the oxygen or sulfur containing compound.

Among the oxygen or sulfur containing compounds that are useful to inhibit polymerization of hydrocarbons in my separation process are ethers, ketones, sulfones, disulfides thioethers, thioureas, nitro compounds, trihydrocarbonyl phosphines, and the like. The useful ethers include acyclic ethers, cyclic ethers and mixed acyclic and cyclic ethers.

Other known polymerization inhibitors can be added to the contacting and recovery zones used in my invention to prevent polymerization of readily polymerizable hydrocarbons that are separated using my invention.

In order to further illustrate certain advantages and embodiments of my invention, the following examples are presented.

EXAMPLE I

Cuprous trifluromethane sulfonate salt complexed with acetonitrile was prepared by refluxing trifluromethane sulfonic acid with cuprous oxide in a meta-xylene reaction medium at atmospheric pressure in a nitrogen atmosphere. This produced a cuprous trifluoromethane sulfonate salt complexed with meta-xylene. This complex was treated with a molar excess of acetonitrile to produce the acetonitrile complex of cuprous trifluromethane sulfonate salt.

A mixture of 50 mol percent para-xylene and 50 mol percent meta-xylene was mixed with the cuprous trifluromethane sulfonate salt complexed with acetonitrile in an amount such that the approximate mol ratio of para-xylene to complex was 1:1. This mixture was heated to approximately 60° C. and agitated. Thereafter, the mixture was allowed to cool to room temperature whereupon a solid phase formed in the reaction vessel. The total contents of the reaction vessel were filtered and the solid phase was washed with benzene at room temperature.

A hydrocarbon fraction was obtained from the recovered crystals by decomposing the crystals with ammonium hydroxide. The resulting hydrocarbon fraction recovered from the decomposed crystals was found to contain 94 mol percent para-xylene and 6 mol percent meta-xylene. These data show an enrichment of the Type II aromatic hydrocarbon(para-xylene) in the solid phase.

EXAMPLE II

Cuprous propane sulfonate salt complexed with toluene was prepared by reacting propane sulfonic acid with cuprous oxide in a toluene reaction medium. This complex was used to separate a mixture of 50 mol percent styrene and 50 mol percent ortho-xylene. The mixture of styrene and ortho-xylene was mixed with the cuprous propane sulfonate salt complexed with toluene and heated to approximately 60° C. The reaction mixture was allowed to cool to room temperature whereupon a solid phase formed. The solid phase was recovered by filtering the total reaction mixture. After washing the solid phase with 2,3-dimethylbutane, a hydrocarbon fraction was recovered therefrom. This hydrocarbon fraction contained over 99 mol percent styrene and less than 1 mol percent ortho-xylene. These data show the separation of a Type I aromatic hydrocarbon (styrene) from a Type III aromatic hydrocarbon(ortho-xylene).

EXAMPLE III

Cuprous benzene sulfonate salt complexed with toluene was used to separate a 50 mol percent styrene and 50 mol percent ethylbenzene mixture, using the procedure of Example I. The hydrocarbon fraction recovered from the solid phase was found to contain over 99 mol percent styrene and less than 1 mol percent ethylbenzene.

EXAMPLE IV

The procedure of Example I is used to separate a mixture of 50 mol percent para-xylene and 50 mol percent ortho-xylene. The hydrocarbon fraction recovered from the solid phase contains over 85 mol percent para-xylene.

It will be apparent to those skilled in the art that many variations and modifications can be made in the foregoing disclosure without departing from the spirit and scope of the invention.

I claim:

1. A process for the separation of $C_8$ aromatic hydrocarbons by structural type comprising:
    (1) contacting a feed mixture of at least two $C_8$ aromatic hydrocarbons having different type numbers with a liquid first cuprous sulfonate salt complex which consists essentially of:
        (a) a cuprous sulfonate salt having the formula $RSO_3Cu$ wherein R is an organic radical containing 1 to 20 carbon atoms and having substituents which are hydrogen, chlorine, fluorine and combinations thereof; and
        (b) an organic complexing agent which is an aromatic hydrocarbon, an olefin hydrocarbon, a nitrile, a nitro-alkyl, a nitro-aryl, a sulfone or combinations thereof, said organic complexing agent being different from at least one of the hydrocarbons having the lowest type numbers in the original mixture of at least two hydrocarbons;
    (2) cooling the resulting mixture of said feed mixture and said first cuprous sulfonate salt complex until a solid phase is produced;
    (3) separating said solid phase from the remaining liquid; and
    (4) recovering from said solid phase a hydrocarbon fraction substantially richer in the $C_8$ aromatic hydrocarbon having the lowest type number in said feed mixture.

2. The process of claim 1 wherein said contacting is carried out at a temperature within the range of 0 to 200° C.

3. The process of claim 1 wherein said resulting mixture is cooled to a temeprature of −20 to +100° C.

4. The process of claim 1 wherein the mol ratio of said first complex to the $C_8$ aromatic hydrocarbon having the lowest type number in said feed mixture of at least two $C_8$ aromatic hydrocarbons is in the range of 0.25:1 to 10:1.

5. The process of claim 1 wherein the R group or said cuprous sulfonate salt is a saturated aliphatic group.

6. The process of claim 5 wherein said R group is hydrocarbon.

7. The process of claim 5 wherein said R group consists of carbon, hydrogen and at least one halogen selected from the group consisting of chlorine and fluorine.

8. The process of claim 1 wherein the R group of said cuprous sulfonate salt is an aromatic group.

9. The process of claim 1 wherein styrene is separated from a feed mixture containing styrene and at least one $C_8$ aromatic hydrocarbon selected from para-xylene, meta-xylene, ortho-xylene and ethylbenzene.

10. The process of claim 1 wherein para-xylene is separated from a feed mixture containing para-xylene and at least one $C_8$ aromatic hydrocarbon selected from meta-xylene, ortho-xylene and ethylbenzene.

References Cited

UNITED STATES PATENTS

| | | | |
|---|---|---|---|
| 2,798,891 | 7/1957 | Schaeffer | 260—674 |
| 2,888,496 | 5/1959 | Scott | 260—674 |
| 2,847,486 | 8/1958 | Bown | 260—674 |
| 2,953,589 | 9/1960 | McCaulay | 260—669 |
| 3,518,322 | 6/1970 | Beckham et al. | 260—674 |

DELBERT E. GANTZ, Primary Examiner

C. E. SPRESSER, JR., Assistant Examiner

U.S. Cl. X.R.

260—674 A